US 6,626,476 B1

(12) United States Patent
Govzman et al.

(10) Patent No.: US 6,626,476 B1
(45) Date of Patent: Sep. 30, 2003

(54) ROBOTIC GRIPPER APPARATUS

(75) Inventors: Boris I. Govzman, Sunnyvale, CA (US); Constantin Foxman, San Francisco, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 09/618,408

(22) Filed: Jul. 18, 2000

(51) Int. Cl.[7] .................................................. B66C 1/42
(52) U.S. Cl. ...................................... 294/119.1; 294/88
(58) Field of Search .............................. 294/119.1, 88, 294/92, 93, 94, 96; 901/36

(56) References Cited

U.S. PATENT DOCUMENTS

| 4,579,380 A | * | 4/1986 | Zaremsky et al. |
| 4,635,985 A | * | 1/1987 | Rooke |
| 4,699,414 A | * | 10/1987 | Jones |
| 4,852,928 A | * | 8/1989 | Monforte |
| 5,947,539 A | * | 9/1999 | Long et al. |
| 6,309,003 B1 | * | 10/2001 | Bertini |
| 6,347,821 B1 | * | 2/2002 | Paek et al. |
| 6,386,609 B1 | * | 5/2002 | Govzman |
| 6,394,521 B1 | * | 5/2002 | Bertini |

* cited by examiner

Primary Examiner—Victor Batson
(74) Attorney, Agent, or Firm—Dugan & Dugan

(57) ABSTRACT

A robotic gripper is provided. The robotic gripper has a rail, a rotary actuator, and at least one slide component moveably mounted on the rail and operatively coupled to the rotary actuator. A first gripping finger is mounted to the at least one slide component so as to move therewith, and a second gripping finger is positioned so that an object may be selectively gripped and ungripped by the first and the second gripping fingers. In a first aspect a magnet is coupled to the rotary actuator and a magnet is coupled to the at least one slide component so that rotation of the rotary actuator selectively causes attraction or repulsion of the magnet coupled to the at least one slide component, thus causing the gripping fingers selectively to assume open and closed positions. In a further aspect, the rotary actuator comprises a rotatable arm. A first extension arm is coupled to the rotatable arm and to the first slide component so that the first slide component moves in a first and a second direction along the rail as the rotatable arm rotates in a first and a second direction, respectively. An object is gripped by placing the gripping fingers adjacent an object to be gripped and by rotating the actuator such that the gripping fingers grip the object.

13 Claims, 4 Drawing Sheets

ROBOTIC GRIPPER APPARATUS

FIELD OF THE INVENTION

The invention relates generally to the field of robotics and more particularly to an apparatus for gripping an object between robotic fingers.

BACKGROUND OF THE INVENTION

In the field of robotic grippers, most systems provide for gripping movement of a finger(s) by driving pistons which are connected to a cam or a lever which is, in turn, coupled to the moveable finger or fingers. Generally, the primary actuation of the piston is effected by pneumatics, wherein a pneumatic pump is attached to an air cylinder for alternately supplying air pressure at a first connection point to drive one or more pistons in a direction toward the fingers, which moves the fingers outwardly to an open position, and then supplying air to an alternate connection point to drive the one or more pistons away from the fingers, to thereby move the fingers inwardly to a closed position.

A primary disadvantage of the prior art piston-driven grippers is the complexity of the piston-cam-finger system or piston-lever-finger system which necessarily increases both the size and the cost of the gripper. In addition, the prior art piston-driven grippers generally have a fixed stroke such that a gripper is calibrated for a single use (e.g., for gripping 200 mm wafers) and cannot be adjusted for gripping an item that is sized differently than the calibrated size. Finally, a disadvantage of the prior art piston-driven grippers is that such grippers have a significant number of moving parts which may potentially deposit contaminants on or in the item to be gripped. Accordingly, robotic grippers are in need of improvement.

SUMMARY OF THE INVENTION

The present invention provides a robotic gripper having a rail, a rotary actuator, and at least one slide component moveably mounted on the rail and operatively coupled to the rotary actuator. A first gripping finger is mounted to the at least one slide component so as to move therewith, and a second gripping finger is positioned so that an object may be selectively gripped and ungripped by the first and the second gripping fingers.

In a first aspect a magnet is coupled to the rotary actuator and a magnet is coupled to the at least one slide component so that rotation of the rotary actuator selectively causes attraction or repulsion of the magnet coupled to the at least one slide component, thus causing the gripping fingers selectively to assume open and closed positions.

In a further aspect, the rotary actuator comprises a rotatable arm. A first extension arm is coupled to the rotatable arm and to the first slide component so that the first slide component moves in a first and a second direction along the rail as the rotatable arm rotates in a first and a second direction, respectively. An object is gripped by placing the gripping fingers adjacent an object to be gripped and by rotating the actuator such that the gripping fingers grip the object.

Other features and advantages of the present invention will become more fully apparent from the following detailed description of the preferred embodiments, the appended claims and the accompanying drawings.

DETAILED DESCRIPTION OF THE PREFERRED EMBODIMENTS

Figure 1:
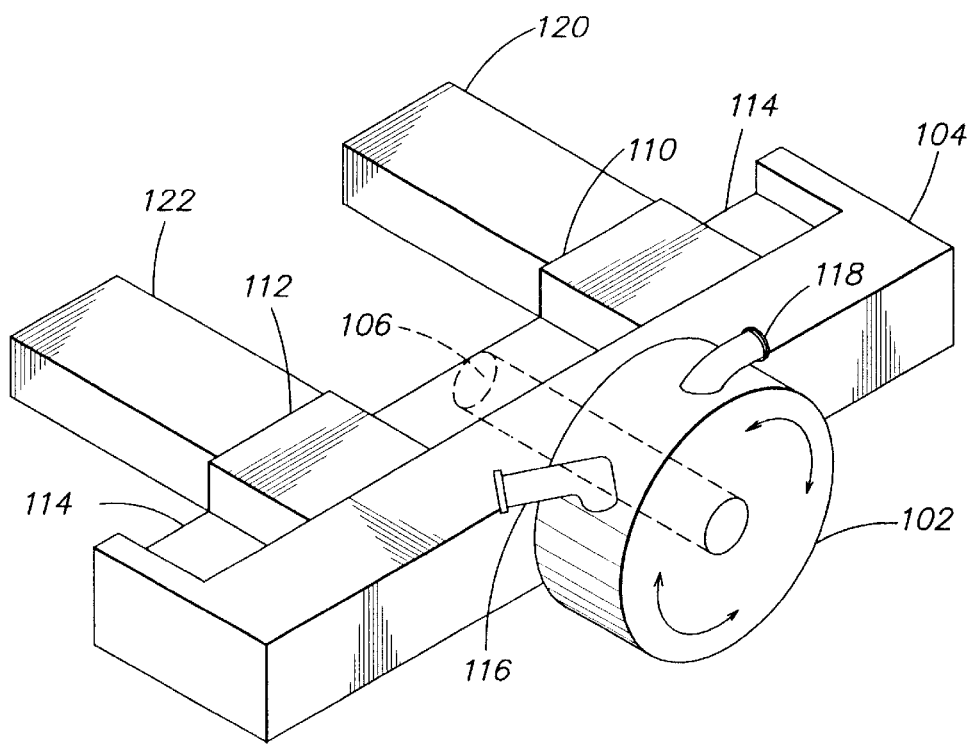
FIG. 1 is a top perspective view of an inventive gripper.

In accordance with the present invention, a rotary actuator actuates slides to move fingers attached thereto into either a closed position, which is generally used for gripping an item along its periphery, or into an open position, which is generally used for releasing an item. As shown in the top perspective view of FIG. 1, the rotary actuator 102 is mounted on baseplate 104, to cause rotation of a centrally disposed spindle 106 in one or both of the directions indicated by the arrows. Although not visible in FIG. 1, the spindle is operatively coupled to the slides 110 and 112, such that the rotation of spindle 106 causes the slides 110 and 112 to move along rails 114, as shown and described with reference to FIGS. 2–5B. The rails 114 may be a continuous rail extending the length of the baseplate 104 or may be two rail segments on either side of the center spindle 106. The motion of the slides 110 and 112 effects movement of the fingers, 120 and 122 respectively, which are fixedly mounted to the slides 110 and 112. Movement of the slides 110 and 112 toward the spindle 106 moves the fingers 120 and 122 into a closed position; while movement of the slides 110 and 112 away from the spindle 106 causes the fingers 120 and 122 to move into an open position. The rotary actuator 102 may be driven by any known mechanism (not shown), including but not limited to a motor, a solenoid, or a pneumatic pump for which connectors 116 and 118 are shown.

Figure 2:
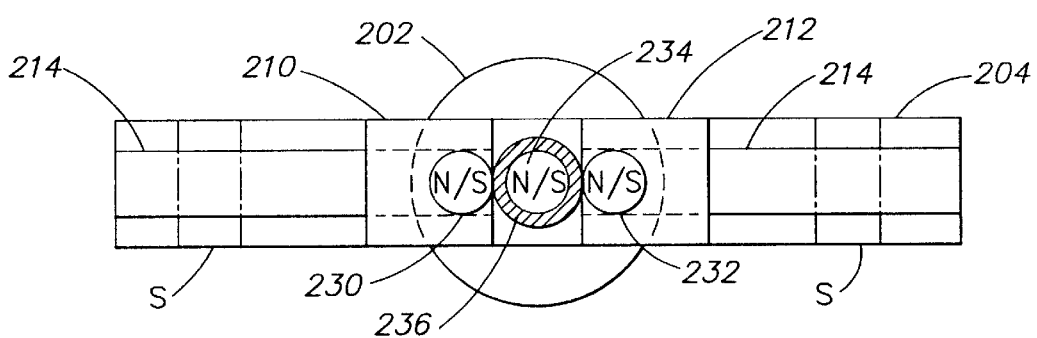
FIG. 2 is a bottom plan view of a magnetic embodiment of the present invention.

Two exemplary embodiments for coupling the rotary spindle 106 to the slides 110 and 112 will now be detailed with reference to the remaining figures. FIG. 2 is a bottom view of an embodiment of the present invention in which the rotary actuator 202 rotates a centrally-disposed magnet 234 coupled to the center spindle 106 (FIG. 1) so as to shift the poles of the centrally-disposed magnet 234 relative to a first and second permanent magnets 230 and 232 which are positioned on or in the slides 210 and 212, respectively. Permanent magnet 230 is mounted in slide 210 with its south pole "exposed" at the inner surface of the slide 210, facing the spindle 106. Similarly, permanent magnet 232 is mounted in slide 212 with its north pole "exposed" at the inner surface of the slide 212, facing the spindle 106. As will be evident to one having ordinary skill in the art, the edge of the mounted permanent magnet itself need not be exposed at the inner surface of the slide, provided that the magnet is mounted in a slide material, such as a plastic that is permeable by the magnetic field of the magnet. Similarly, the centrally-disposed magnet 234 may be mounted in a sleeve 236 of magnetically permeable material.

When the centrally-disposed magnet 234 is rotated to the position illustrated in FIG. 2, wherein the centrally disposed magnet 234's north pole is facing the south pole of the first magnet 230 and the centrally disposed magnet 234's south pole is facing the north pole of the second magnet 232, the first and second slides 210 and 212 then are drawn along rail 214 until the first and second slides 210, 212 contact with the centrally-disposed magnet 234. The gripper fingers 120, 122 (FIG. 1) which are mounted on the first and second slides 210, 212, therefore also move inwardly and assume a closed position wherein they engage the item (e.g., wafer W) to be gripped, as further discussed below with reference to FIG. 4B. The tolerances, specifically the distance between the two fingers, will be dictated by the dimensions of the item to be gripped. The width of the centrally-disposed magnet 234 and/or the thickness of any sleeve 236 of magnetically permeable material about the centrally-disposed magnet 234 may be adjusted to achieve the desired tolerance. Similarly, the location in which the gripper fingers are mounted on the slides 210, 212 may be selected to achieve the desired gripping dimensions. Adjustable stops S may be selectively positioned along the rail 204 So as to limit either the inward or outward movement of the slides; thus the gripper's stroke may be easily adjusted so as to grip objects of different sizes.

Figure 3A:
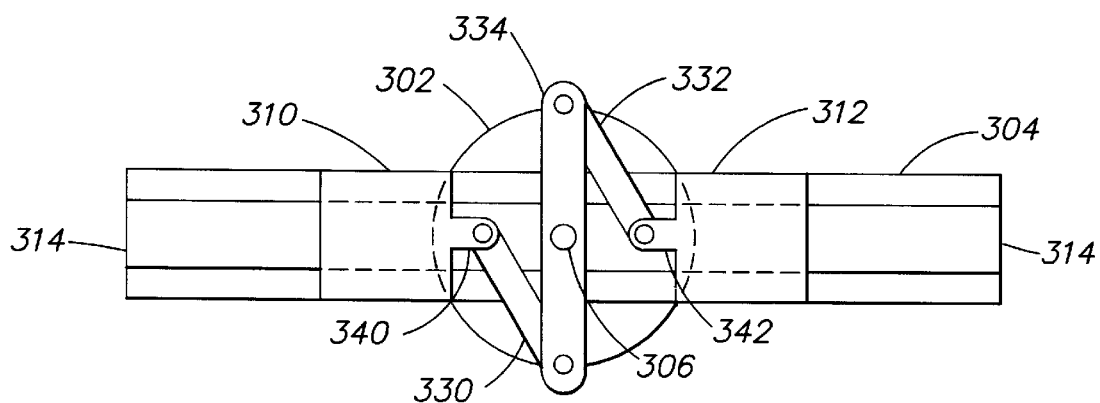
FIG. 3A is a bottom plan view of an alternative embodiment of the inventive gripper, in which a rotary actuator is coupled to a three-armed elliptic cam follower.

FIG. 3A is a bottom plan view of an alternative embodiment of the inventive gripper, in which a rotary actuator is coupled to a three-armed elliptic cam follower. As shown in FIG. 3A, a rotary actuator 302 is secured to a baseplate 304, which baseplate 304 has a pair of rails 314 disposed along its length. A first and second slides 310 and 312 are moveably mounted to the rails 314 to allow movement of the slides 310, 312 back and forth along the rails 314. Although not shown in FIG. 3A, the first and second fingers of FIG. 1 may be fixedly mounted to the first and second slides 310, 312, respectively. An elliptic cam follower comprising a first and second extension arms 330, 332 and a center arm 334 is secured to the rotatable spindle 306. Specifically, the center arm 334 is mounted to the spindle 306 such that the center arm 334 may be rotated therewith in the range of 0° to 90° with respect to the longitudinal axis (i.e., the length) of the rails 314. A first end of the center arm 334 connects to a first end of the first extension arm 330, which has a second end connected to the first slide 310. Similarly, a second end of center arm 334 connects to a first end of the second extension arm 332, and a second end of the second extension arm 332 couples to the second slide 312. Each of slides 310 and 312 has an extension piece, shown as 340 and 342 respectively, to facilitate connection to the elliptic cam follower's first and second extension arms 330 and 332, respectively, so that the slides 310, 312 can be attached to the extension arms 330, 332 without interfering with the attachment of the fingers of FIG. 1.

Figure 3B:
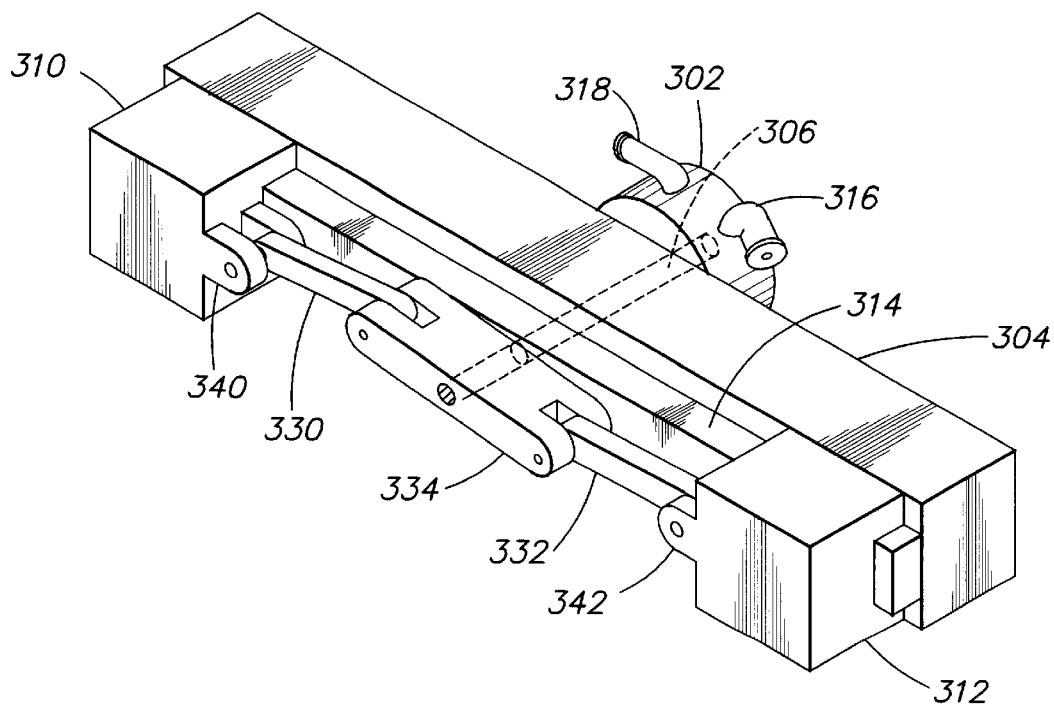
FIG. 3B is a bottom perspective view of the inventive gripper of FIG. 3A shown in an open position.

FIG. 3B is a bottom perspective view of the inventive gripper of FIG. 3A, shown in an open position with the cam follower's center arm 334 rotated on center spindle 306 to the position at which the longitudinal axis of the center arm 334 approaches a 0° angle with respect to the longitudinal axis of the rails 314. When the center arm 334 is in this position, the extension arms 330 and 332 are almost fully extended and slides 310 and 312 are positioned at the far ends of the rails 314. The extension arms 330 and 332 are pivotally mounted to the extension portions 340 and 342 of slides 310 and 312, respectively, and are pivotally attached to the center arm 334. The pivotal mountings allow effectively frictionless translation of the rotary motion of the spindle 306 to the elliptical motion of the center arm 324 and the resulting lateral extension and retraction of the arms 330 and 332. The angle of rotation of the rotary actuator 306 may be adjusted to change the amount of rotation of the center arm 334. (For example, the angle of rotation of the center arm may range from 0° to 90° wherein 0° may be the position wherein the longitudinal axis of the center arm 334 is in line with the longitudinal axis of the rails 314. Consequently, the amount of extension of each of the first and second extension arms 330, 332 and the resulting distance that the first and second slides 310, 312 move along rails 314 may be adjusted. Thus, the inventive gripper may be easily adjusted when an object of a different size is to be gripped. Actuation of the elliptic cam follower using pneumatic connectors 316 and 318, along with adjustment of the angle of rotation is further discussed below with reference to FIGS. 5A and 5B.

Figure 4A:
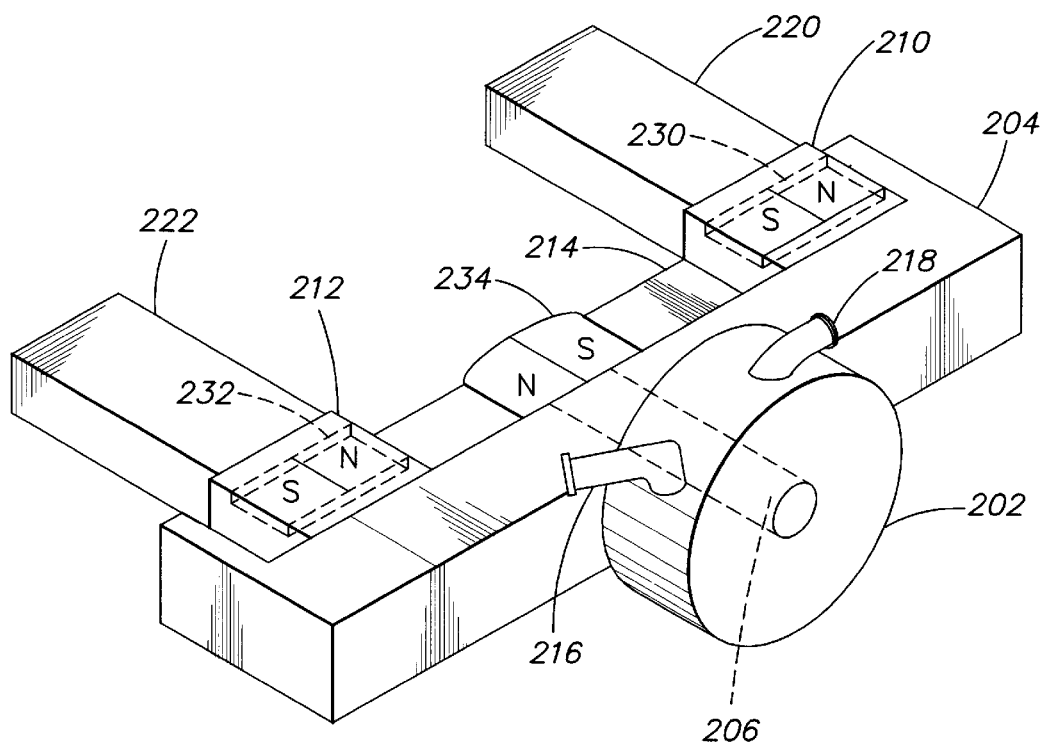
FIG. 4A is a top perspective view of the magnetic embodiment (FIG. 2) of the invention showing the inventive gripper assembly in an open position.

The operation of the FIG. 2 and FIG. 3 embodiments of the invention will now be described in greater detail with reference to FIGS. 4A–B. FIG. 4A is a top perspective view of the magnetic embodiment (FIG. 2) of the invention showing the inventive gripper assembly in an open position.

Specifically, the south pole of the centrally-disposed magnet 234 is facing the south pole of the first permanent magnet 230 which is disposed in first slide 210 and the north pole of the centrally-disposed magnet 234 is facing the north pole of the second permanent magnet 232 which is disposed in the second slide 212. This orientation of the centrally-disposed magnet 234 is achieved by driving the rotary actuator 202, using pneumatic connectors 216 and 218 which are connected to a driving mechanism D such as a pneumatic pump, or an electrical solenoid. When air is introduced into the rotary actuator 202, (e.g., via the first connector 216) an internal baffle (not shown) fixedly coupled to the spindle 206 rotates in a first direction causing the spindle 206 to rotate therewith. The angle of rotation of the baffle and hence of the spindle 206 is adjustable, as is well known in the relevant art. Accordingly, upon rotation of the spindle 206 in the first direction the centrally-disposed magnet 234 rotates in the first direction to the illustrated orientation, wherein magnetic forces cause the south pole of the first magnet 230 coupled to the first slide 210 and the north pole of the second magnet 232 coupled to the second slide 212 to be repelled respectively by the north and south poles of the centrally-disposed magnet 234. As such, the first and second slides 210, 212 are moved away from the center spindle 206 along rails 214 to their respective open positions, thus causing the first and second fingers 232 and 230, respectively coupled to the first and second slides to move away from each other. Thus, the inventive gripper releases any wafer (not shown) held by the gripper.

Figure 4B:
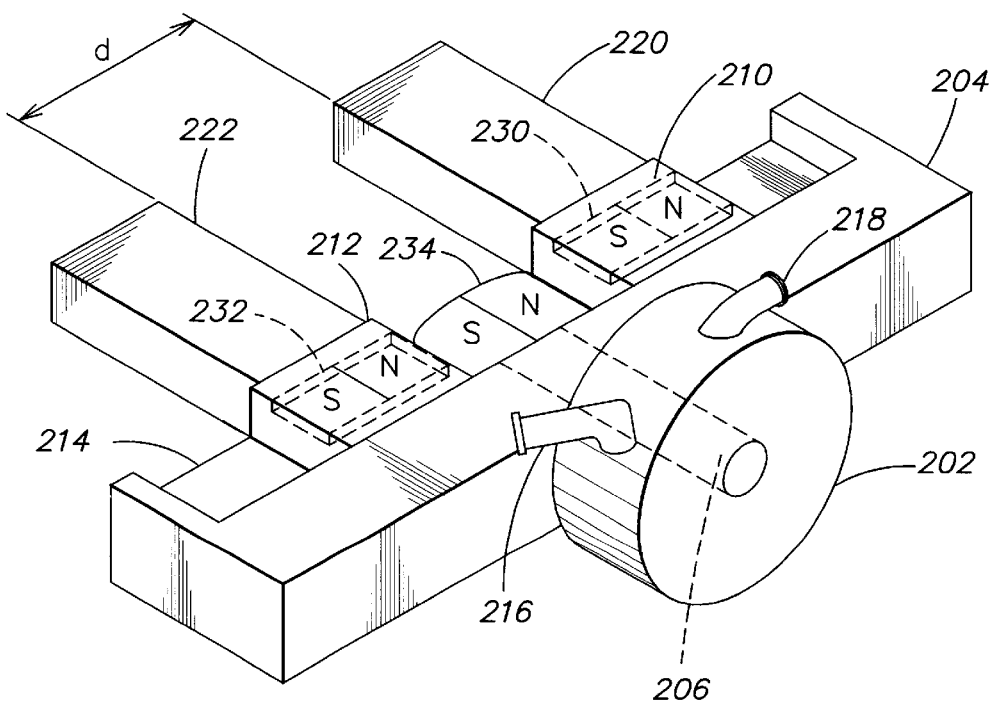
FIG. 4B is a top perspective view of the magnetic embodiment (FIG. 2) of the invention showing the inventive gripper in a closed position.

FIG. 4B is a top perspective view of the magnetic embodiment (FIG. 2) of the invention showing the inventive gripper in a closed position. To move the inventive gripper from the open position of FIG. 4A to the closed position of FIG. 4B, the actuator rotates the spindle 206 (e.g., by forcing air through the second connector 218 so as to move the internal baffle (not shown) in a second direction, opposite to that of FIG. 4A). As the spindle 206 rotates in the second direction, the centrally-disposed magnet 234 rotates (e.g., approximately 180°). As the north pole of the centrally-disposed magnet 234 is brought around to face the south pole of the first magnet 230 coupled to the first slide 210, the first magnet 230 coupled to the first slide 210 is drawn toward the opposite pole of the centrally-disposed magnet 234, thereby causing the first slide 210 to move along the rails 214 toward the centrally-disposed magnet 234. Simultaneously, as the south pole of the centrally-disposed magnet 234 rotates to face the north pole of the second magnet 232, coupled to the second slide 212, the second magnet 232 is drawn toward the opposite pole of the centrally disposed magnet 234, thereby causing the second slide 212 to move along the rails 214 toward the centrally-disposed magnet 234. Accordingly, the second finger 222 which is coupled to the second slide 212 is brought toward the center spindle 206 and the first finger 220 which is coupled to the first slide 210 is brought toward the center spindle 206. FIG. 4B shows the inventive gripper in a closed position, in which the fingers 220 and 222 are separated by a desired gripping (e.g., 200 mm for engaging the edges of a 200 mm wafer) and a wafer (not shown) may be grasped thereby.

Figure 5A:
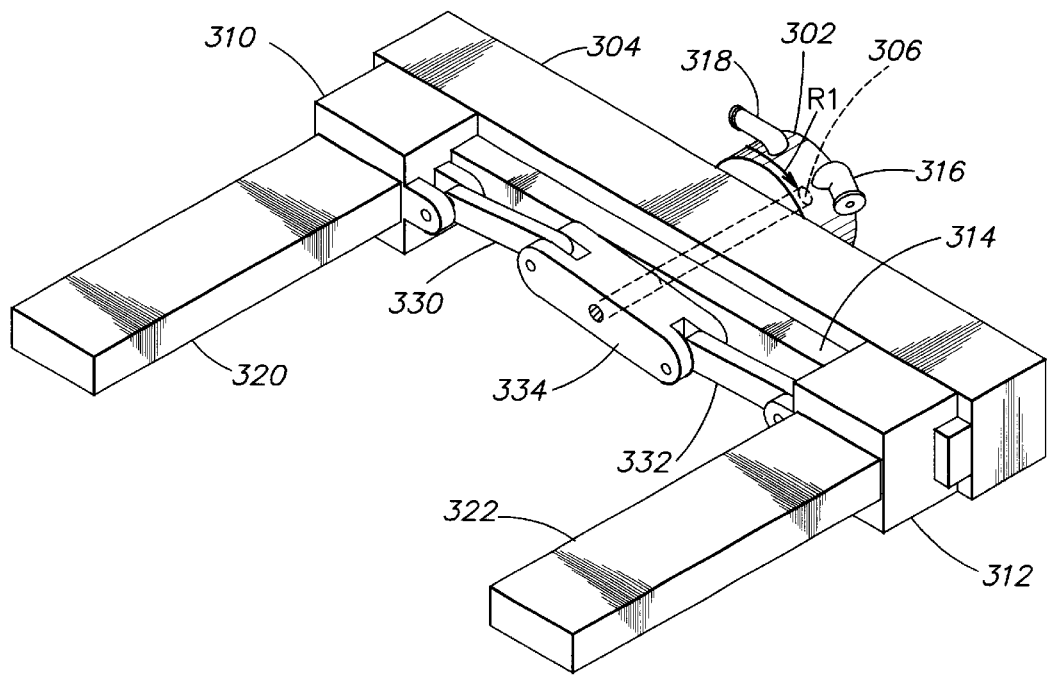
FIG. 5A is a bottom perspective view of the elliptical cam follower embodiment (FIG. 3) of the invention showing the inventive gripper in an open position.
Figure 5B:
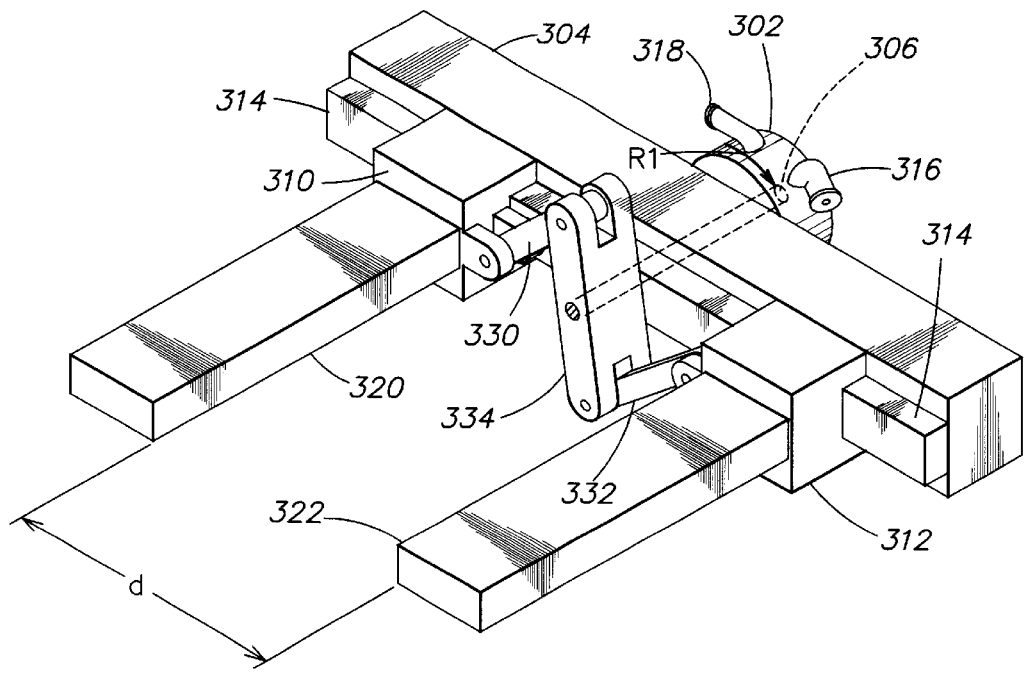
FIG. 5B is a bottom perspective view of the elliptical cam follower embodiment (FIG. 3) of the invention showing the inventive gripper in a closed position.

FIG. 5A is a bottom perspective view of the elliptical cam follower embodiment (FIG. 3) of the invention showing the inventive gripper in an open position. To move the inventive gripper from the open position of FIG. 5A to a closed position shown in FIG. 5B, air may be introduced from a pneumatic pump into the actuator 302's first connector 316. The actuator 302 then rotates the center spindle 306 in the first direction (indicated by arrow R1), from a position in which the center arm 334 of the elliptic cam follower is substantially parallel (i.e., at a 0° angle) to the longitudinal axis of the rails 314 (as shown in FIG. 5A) to a position in which the angle between the longitudinal axis of the center arm 334 relative to the longitudinal axis of the rails 314 is greater (e.g., up to 90°) as shown in FIG. 5B. As the spindle 306 rotates in the first direction (as indicated by the arrow R1), the center arm 334 of the cam follower also rotates in the first direction. As the center arm 334, rotating in the first direction, approaches an orientation in which the longitudinal axis of the center arm 334 is perpendicular to the longitudinal axis of rails 314, the first and second extension arms 330 and 332 are drawn closer to the center spindle 306. As the first and second arms 330 and 332 are drawn toward the center spindle 306, the first and second slides 310 and 312 respectively connected thereto are drawn along the rails 314 toward the center thereof. Accordingly, the first and second fingers 320 and 322 which are respectively mounted on the first and second slides 310 and 312 are brought closer together to within the distance d, as shown in FIG. 5B. Distance d is the predetermined grip size or distance between the two fingers 320, 322. The distance d may be equal to the outer diameter of the item to be gripped. FIG. 5B illustrates the resulting position of the components when the rotary actuator 306 has rotated the elliptic cam follower to move the fingers 320, 322 into the closed position.

Rotation of the spindle 306 in a second direction, opposite to the arrow R1 (FIG. 5A) moves the center arm 334 from the orientation wherein the center arm 334 is substantially perpendicular to the longitudinal axis of the rails 314, toward the orientation wherein the center arm 334 is substantially parallel to the longitudinal axis of the rails 314. Hence, the first and second extension arms 330, 332, the first and second slides 310, 312 and the first and second fingers 320, 322 move away from the center spindle 306, to an open position wherein the fingers 320, 322 are separated by a distance greater than d.

As will be understood by one having familiarity with the pneumatic driving of a rotary actuator, introduction of air into one connector (e.g., connector 316 of FIGS. 5A and 5B) positioned on a first side of a baffle (not shown) within the actuator 306, will cause the baffle to rotate in a first direction; while introduction of air into another connector (e.g., connector 318 of FIGS. 5A and 5B), which is positioned on the opposite side of the baffle (from the first connector), will cause the baffle to rotate in a second direction, opposite the first direction. Alternative implementations of pneumatics or of other means for driving the rotary actuator are well understood in the art and could be alternatively employed by the inventive grippers.

As is also well-known in the field of rotary actuators, the angle of rotation of a component coupled to the center spindle 206, 306 can be adjusted, for example by the amount of air introduced by a pneumatic pump or by the amount of energy introduced to drive a solenoid type actuator or by adjusting the initial orientation of a baffle disposed within the rotary actuator. Thus, by applying a torquing force to the center spindle, the angle of rotation thereof can be adjusted as is known in the art. Accordingly, by application of torque to the center spindle, the center arm of the elliptic cam follower of FIG. 3 can be adjusted to thereby adjust the extension of the attached arms and the slides' range of movement also referred to as the "stroke" of the gripper. The torquing force may be applied to the center spindle when the gripper fingers are in an open position. As a result, the elliptical cam follower embodiment provides an adjustable gripper apparatus which may be easily adjusted to grasp objects having different sizes.

While the foregoing description discloses only the preferred embodiments of the invention, modifications of the above-disclosed apparatus and method which fall within the scope of the invention will be readily apparent to those having ordinary skill in the art. For instance, the invention could also be implemented using a single moveable slide-finger arrangement. For example, the embodiment of FIG. 2 could be implemented using a permanent magnet disposed on a single slide relative to a rotatable magnet. In such an embodiment, as the slide moves toward the rotatable magnet due to the attraction of the slide's magnet to the opposite polarity of the rotatable magnet, the finger coupled to the slide would move toward a fixed finger, in order to form the gripper's closed position. For release of a grip, the rotatable magnet would be rotated (to the orientation at which its pole having the same polarity as the slide magnet's exposed pole faces the slide magnet's exposed pole), thereby repelling the slide magnet, causing the slide to move along the rail away from the rotatable magnet, and causing the slide's finger to move away from the fixed finger to thereby release the object being gripped. Similarly, the embodiment of FIG. 3 could be implemented with one moveably mounted slide having a first gripper finger mounted thereto and with a second fixed position gripper finger.

Further, other elliptical cam followers can be employed rather than the three-linked-arm type elliptical cam follower (e.g., slidably coupled cams and followers may be employed rather than linked couplings). Finally, it will be understood by those of ordinary skill in the art that specific orientations and numbers of components are merely exemplary of the presently preferred embodiment of the invention, and that the invention is not to be limited thereby. For instance, the baseplate, although convenient, may be omitted, and the actuator coupled directly to the rail. Further, the spindle need not extend through the rail. A moveable slide may extend around (e.g., both above and below) the rail, or the actuator and the slides may be mounted on the same side of the rail. Also, although most grippers move apart to release an object, and move together to grip an object, some grippers, such as those for gripping hollow objects, place gripper fingers inside an object and then move the grippers apart to thereby grasp the object from the inside thereof. Accordingly, the open and closed, gripping and releasing positions described herein are merely exemplary.

Accordingly, while the present invention has been disclosed in connection with the preferred embodiments thereof, it should be understood that other embodiments may fall within the spirit and scope of the invention as defined by the following claims.

What is claimed is:

1. A robotic gripper comprising:
   a rail;
   a non-threaded rotary actuator;
   at least one slide component slideably mounted on the rail and being operatively coupled to the rotary actuator;
   a first gripping finger mounted to the at least one slide component so as to move therewith; and
   a second gripping finger positioned so that an object may be selectively gripped and ungripped by the first and the second gripping fingers.

2. A robotic gripper comprising:
   a rail;
   a rotary actuator comprising a rotatable magnet;
   at least one slide component slideably mounted on the rail and being operatively coupled to the rotary actuator;
   a first gripping finger mounted to the at least one slide component so as to move therewith; and
   a second gripping finger positioned so that an object may be selectively gripped and ungripped by the first and the second gripping fingers;
   wherein the at least one slide component comprises a first slide component having a first magnet, the first magnet having a pole of a first polarity facing the rotatable magnet.

3. The apparatus of claim 2 further comprising a second slide component moveably mounted on the rail and being operatively coupled to the rotatable magnet, wherein the second finger is mounted on the second slide component, and wherein the second slide component comprises a third magnet having a pole of the second polarity facing the rotatable magnet.

4. A robotic gripper comprising:
   a rail;
   a rotary actuator comprising a rotatable arm;
   at least one slide component slideably mounted on the rail and being operatively coupled to the rotary actuator;
   a first gripping finger mounted to the at least one slide component so as to move therewith; and a second gripping finger positioned so that an object may be selectively gripped and ungripped by the first and the second gripping fingers; and
   a first extension arm coupled to the rotatable arm and to the first slide component so that the first slide component moves in a first and a second direction along the rail as the rotatable arm rotates in a first and a second direction, respectively.

5. The apparatus of claim 4 further comprising a second extension arm coupled to the rotatable arm and to the second slide component so that the second slide component moves in a second and a first direction along the rail as the rotatable arm rotates in a first and a second direction, respectively.

6. A robotic gripper comprising:
   a rail;
   a rotary actuator comprising an elliptical-cam-follower;
   at least one slide component slideably mounted on the rail and being operatively coupled to the rotary actuator;
   a first gripping finger mounted to the at least one slide component so as to move therewith; and a second gripping finger positioned so that an object may be selectively gripped and ungripped by the first and the second gripping fingers.

7. A method of gripping an object, comprising:
   providing a gripping mechanism having a non-threaded rotary actuator and a pair of gripping fingers slideably mounted on a rail;
   placing the gripping fingers adjacent an object to be gripped; and
   rotating the non-threaded actuator such that the gripping fingers slide along the rail to a position in which they grip the object.

8. A method of gripping an object, comprising:
   providing a gripping mechanism having a rotary actuator and a pair of gripping fingers slideably mounted on a rail;
   placing the gripping fingers adjacent an object to be gripped; and
   rotating the actuator such that the gripping fingers slide along the rail to a position in which they grip the object;
       wherein rotating the actuator such that the gripping fingers grip the object comprises:
           rotating a rotary magnet from a first position to a second position so as to reverse the polarity of the rotary magnet; and
           attracting one or more magnets coupled to one or more of the gripping fingers.

9. A method of gripping an object, comprising:
   providing a gripping mechanism having a rotary actuator and a pair of gripping fingers slideably mounted on a rail;
   placing the gripping fingers adjacent an object to be gripped; and
   rotating the actuator such that the gripping fingers slide along the rail to a position in which they grip the object;
       wherein rotating the actuator such that the gripping fingers grip the object comprises:
           rotating a rotary arm from a first position to a second position and thereby retracting or extending at least one extension arm coupled to the rotary arm and to at least one of the gripper fingers.

10. A method of gripping an object, comprising:
    providing a gripping mechanism having a rotary actuator and a pair of gripping fingers slideably mounted on a rail;
    placing the gripping fingers adjacent an object to be gripped; and
    rotating the actuator such that the gripping fingers slide along the rail to a position in which they grip the object;
        wherein rotating the actuator such that the gripping fingers grip the object comprises:
            rotating an elliptical cam from a first position to a second position and thereby retracting or extending at least one cam follower coupled to the elliptical cam and to at least one of the gripper fingers.

11. The apparatus of claim 2 further comprising an adjustable stop coupled to the rail so as to limit the movement of the at least one slide component.

12. The method of claim 8 further comprising:
rotating a rotary magnet from a first position to a second position so as to reverse the polarity of the rotary magnet; and
repelling the one or more magnets coupled to one or more of the gripping fingers.

13. The method of claim 12 further comprising:
limiting a distance that the one or more magnets travel when repelled, via an adjustable stop.

* * * * *